Sept. 8, 1964

A. D. PINOTTI 3,148,239

ELECTRODE ASSEMBLY CONSTRUCTION FOR GLASS FURNACE

Filed Aug. 10, 1962

INVENTOR.
ALFRED D. PINOTTI
BY E. J. Holler
W. A. Schaich
ATTORNEYS

Sept. 8, 1964  A. D. PINOTTI  3,148,239
ELECTRODE ASSEMBLY CONSTRUCTION FOR GLASS FURNACE
Filed Aug. 10, 1962  2 Sheets-Sheet 2
FIG. 3
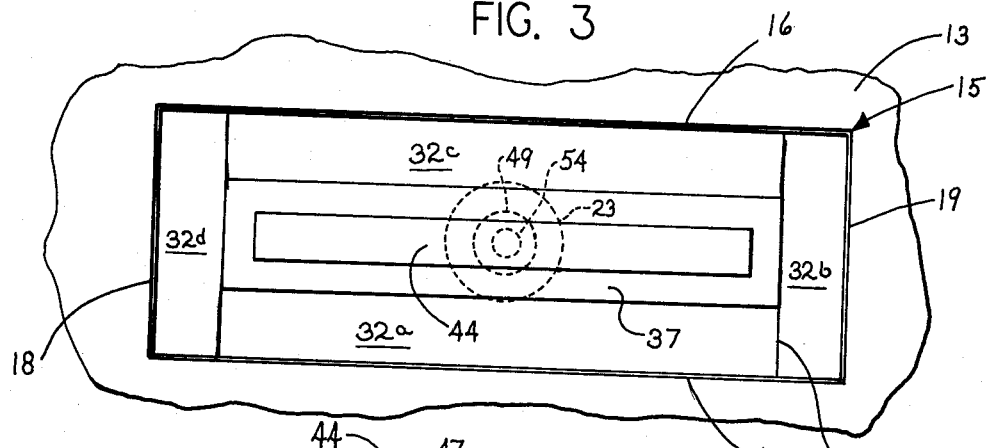
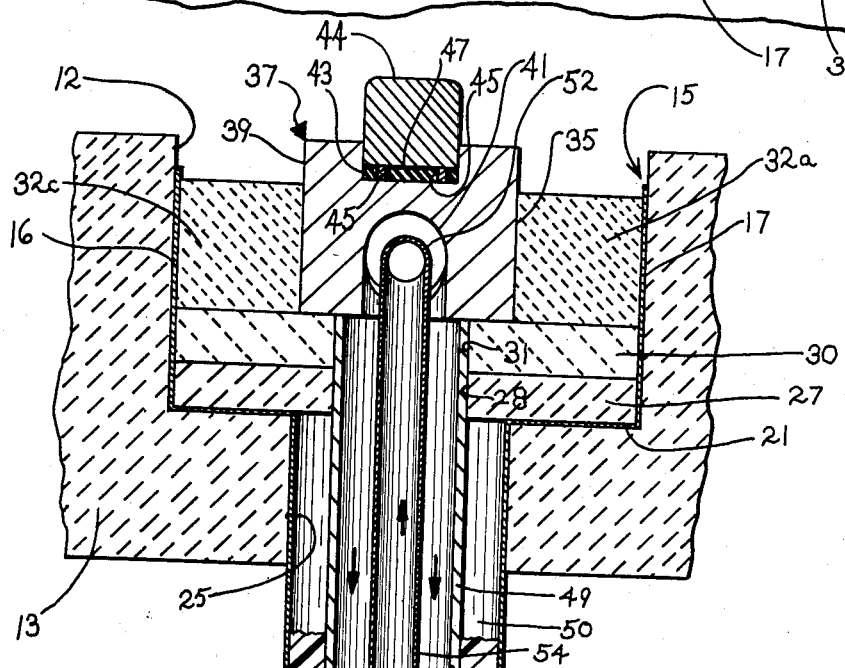
FIG. 2
INVENTOR.
ALFRED D. PINOTTI
BY E. J. Holler &
W. A. Schaich
ATTORNEYS United States Patent Office 3,148,239
Patented Sept. 8, 1964

3,148,239
ELECTRODE ASSEMBLY CONSTRUCTION FOR GLASS FURNACE
Alfred D. Pinotti, Toledo, Ohio, assignor, by mesne assignments, to Owens-Illinois Glass Company, Toledo, Ohio, a corporation of Ohio
Filed Aug. 10, 1962, Ser. No. 216,257
10 Claims. (Cl. 13—6)

The present invention relates generally to glass melting furnaces.

The term "glass" as used herein is to be deemed to include vitreous materials generally.

More particularly, the present invention relates to an improved electrode construction of utility in melting or augmenting the melting of vitrescent raw materials.

In the manufacture of commercial glass products from batch raw materials, it has been found to be desirable in many instances to utilize electric melting techniques to accomplish the melting of the raw materials. In this technique a plurality of electrical conductive electrodes are projected through the side or bottom walls of the furnace to project into the molten glass. The batch of granular raw materials and cullet are usually deposited on the surface of the molten glass. A high amperage current is impressed across the electrodes and the current flows from one to another in a path which takes it through the molten glass to thereby complete the electrical circuit. The location and spacing between these electrodes establishes the current paths in the glass body. The molten glass in these current paths offers an electrical resistance inversely proportional to the temperature, and accordingly the glass is continuously heated according to Joule's law (often referred to as Joule heating effect) as the current traverses the current paths established between the located electrodes. The electrodes themselves are generally composed of materials, such as graphite, carbon, tungsten or molybdenum.

Unfortunately, the electrode being in direct contact with the molten glass is subject to a number of deleterious effects, including physical erosion due to the movement of the glass within the furnace and also due to the corrosive nature of many of the constituents within the glass itself or produced as by-products. The electrodes are also subject to oxidation induced by the presence of air which gains entry to the furnace through the mounting or support construction utilized in introducing the electrode through the wall of the furnace. One very serious problem that is thereby frequently encountered, particularly in the use of an electrode formed of molybdenum, is the occurrence of visible defects in the form of small metallic oxide particles of molybdenum in the ultimately formed glass article. These defects are frequently referred to in the art as "white smear" or "black molybdic oxide." These defects seriously detract from the usefulness of the glass, particularly where optical clarity is required. This is true in the case of tableware, optical glass and also in the case of faceplate glass for television tube envelopes.

Difficulty has also been encountered in electrode mounting structures known heretofore in that short circuits frequently develop which reduce the current flow within the molten glass and, what is even more troublesome, necessitate in many cases the shutting down of the furnace for correction of the short circuit whereby complete replacement of the electrode and/or its supporting or mounting structure must be effected.

With the foregoing general introduction, it may be stated that it is an object of the present invention to provide an electrode mounting assembly which embodies improved features of insulation, thereby precluding to a greater degree than heretofore possible the developing of short circuits during the desired continuous operation of glass melting furnaces employing "Joule effect" heating, either entirely or in a supplemental fashion.

It is also an object of the present invention to provide an electrode mounting assembly, the construction features of which furnish a large surface area of the electrode for more effective current flow through the molten glass contained in the glass melting furnace and also demonstrating a longer electrode life.

It is still another object of the present invention to provide an electrode supporting construction which therefore is essentially trouble free in operation.

It is yet another object of the present invention to provide an electrode assembly construction which is so installed in the furnace wall that the electrode (e.g. molybdenum) itself is effectively sealed from the outside atmosphere, thereby precluding the entry of air and/or moisture which otherwise produces deleterious effects in the finished articles formed from the glass melted in the furnace.

It is yet another object of the present invention to provide such an electrode assembly which includes provision for purging the assembled construction of any residual air or moisture present by reason of the atmospheric conditions prevalent at the time of installation of the assembly.

It is likewise an object of the present invention to provide an electrode support assembly which can be installed with a minimum of difficulty, is constructed of readily available materials at a minimum of expense, thereby providing an economical and highly serviceable installation.

The objects enumerated just hereinabove, as well as others, will become apparent to those skilled in the art from the following detailed description taken in conjunction with the annexed sheets of drawings on which there is presented, for purposes of illustration only, a single embodiment of the electrode assembly construction in accordance with this invention.

In the drawings:

FIG. 2 is a sectional view taken on the line 2—2 of FIG. 1.

FIG. 3 is a top plan view of a portion of the bottom horizontal wall of the furnace surrounding the electrode assembly.

Figure 1:
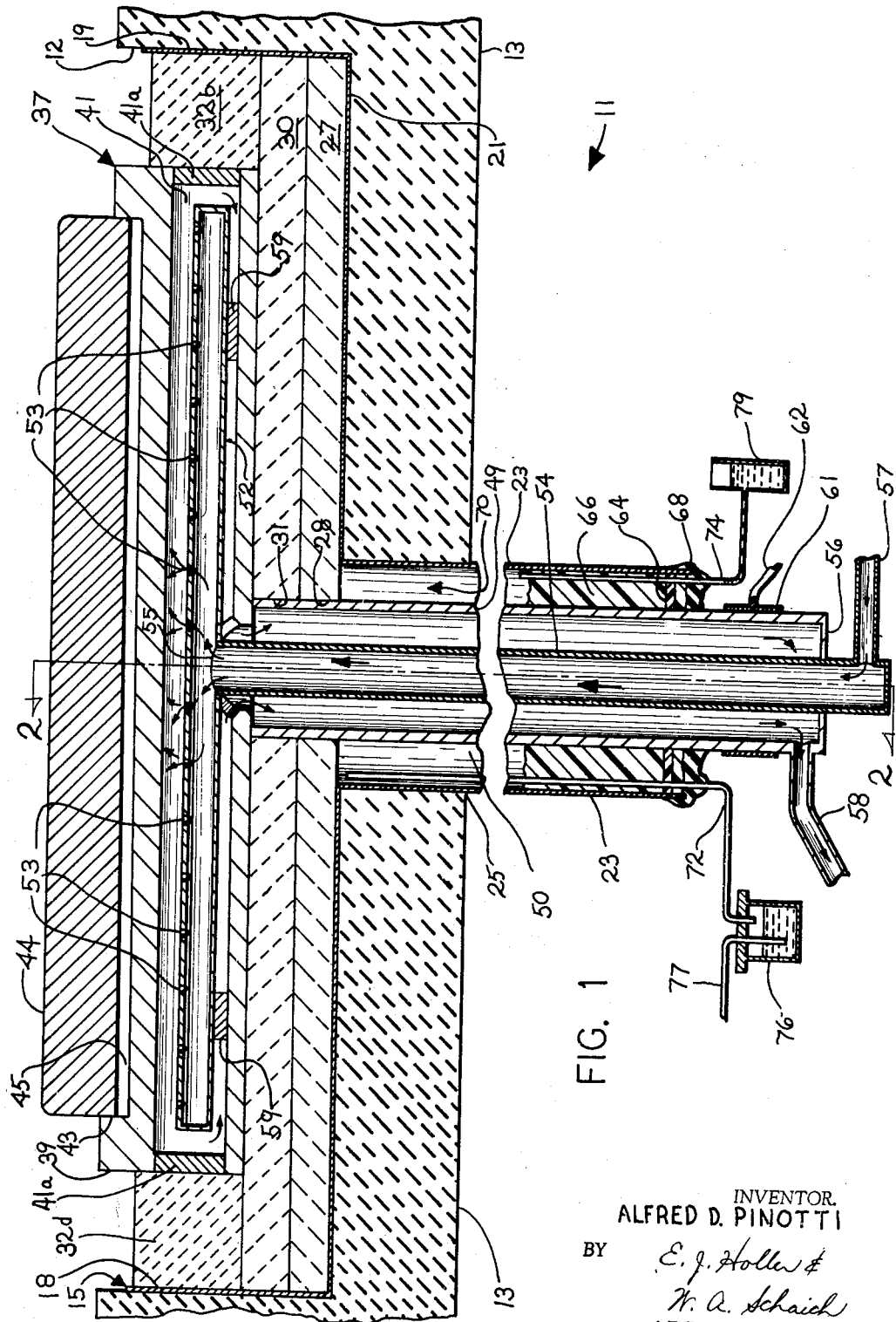
FIG. 1 is a vertical sectional view (partially fragmentary) of a bottom wall of a glass melting furnace and showing the electrode mounting assembly in accordance with this invention positioned in operative condition and with novel means for projecting the electrode through the furnace wall.

The electrode assembly in accordance with this invention comprises in its simplest form a housing or casing defining a cavity and being adapted for mounting in a furnace wall with the cavity facing inwardly, a hollow conduit member communicatingly connecting with said cavity and extending oppositely from said cavity to project through the furnace wall and beyond, a mass or body of insulating material located in said cavity and defining a recessed cavity therein, an electrode having one leg located within said second cavity in such fashion that essentially but one face of said electrode is exposed and the other leg of which electrode extends axially through said conduit in spaced relationship, thereby defining an annular passageway, and sealant means for said passageway serving to prevent the entry of oxygen, air, moisture and the like into said passageway.

In accordance with a preferred embodiment of the present invention, the electrode assembly includes means for introducing into said passageway interiorly of said sealant means, and withdrawing therefrom, a substance capable of absorbing any moisture or air present.

Referring now more specifically to the drawings, there is disclosed in considerable detail an electrode supporting assembly 11 in accordance with a preferred embodiment of the invention. The electrode assembly 11 is shown recessed in recess 12 located in the bottom wall 13 of the glass melting furnace. The bottom wall of the furnace, as illustrated in the drawings, is shown as a solid section of fire brick insulating material. It will be appreciated, however, that this is for clarity and simplicity of illustration and that the bottom wall may in fact be composed of a plurality of individual bricks stacked in conventional overlapping relationship. It will be appreciated that, for clarity of illustration, only one such electrode assembly 11 is illustrated but that in actual practice a plurality of these electrode assemblies will be positioned in the bottom wall of a glass melting furnace in spaced pairs or banks for the carrying on of the "Joule effect" heating. Located within the recess 12 is one component of the assembly in the form of a casing or housing member 15 composed of parallel upstanding side walls 16 and 17, connected at their extremities by parallel upstanding end walls 18 and 19, all of which are connected to bottom wall 21 disposed horizontally within the recess 12 in the bottom wall 13 of the furnace (not shown). Extending communicatingly downwardly from the bottom wall 21 is a circular conduit 23 which proceeds very snugly through an appropriate opening 25 in the furnace wall to project exteriorly of the furnace.

Horizontally disposed on the bottom wall 21 of the casing 15 is a flat rectangular section 27 of solid preformed Crystallite ($Al_2O_3 \cdot SiO_2$) refractory. This section of refractory touches all of the four upstanding walls at their juncture with the bottom wall and includes a central aperture 28 for a purpose to be described hereinafter. Flushly on top of the layer 27 of Crystallite is a second layer 30 of refractory, in this case zircon ($ZrSiO_4$). This layer section also touches the side walls and includes a central aperture 31 for a purpose to be described. This just described section of refractory is usually assembled in the casing as a mixture of a powdered form of Zircon and sufficient water to form a trowelable or semi-plastic consistency. The purpose for this will become apparent from description to appear later herein. About the marginal portion of the casing proximate the side and end walls 16, 17, 18 and 19 there are suituated four lengths 32a, 32b, 32c and 32d of preformed or precut sections of Zircon refractory. If desired, the solid Zircon refractory can be precut as a single annular piece, thereby eliminating the seams 33 (FIG. 3) where the lengths meet and thereby defining a second cavity 35 into which the electrode holder sub-assembly 37 may be located as will now be described.

The electrode holder sub-assembly 37, as can be seen in FIGS. 1 and 2, is composed of a linear (generally rectangular in section) length of steel 39 having an axial bore 41 whose opposite ends are plugged by the plugs 41a, shown in FIG. 1. The linear holding member 39 includes an upwardly facing recess 43 into which is press fitted a molybdenum electrode 44 which rests on spacing legs 45 to insure level position of the face of the electrode bar. A copper braze 47 fills the space (recess 43) between the linear member 39 and electrode 44, thereby serving to additionally hold the latter and provide for a good electrical connection. The braze is an oxygen-free copper alloy which is initially present as a flux but which upon pre-heating permits the electrode 44 to fit down into the recess 43 evenly, creating a good electrical weld and parallel location of the electrode 44. For ease of illustration, the copper brazing forming the electrical weld connection between the molybdenum electrode and the horizontal electrode holder has been shown only in FIG. 2. It should be understood that it is present in the embodiment shown in FIG. 1 but it is felt that its inclusion in section might otherwise detract from the construction details already illustrated. Connected sealingly to the linear member 39 is a normally depending pipe 49 which extends axially within conduit 23 in spaced relationship defining therebetween an annular passageway 50, extending generally from the outer extremity of conduit 23 to the refractory section 27 whose central aperture 28 has a diameter snugly receiving the pipe 49 as does the aperture 31 of refractory section 30. The pipe 49 extends axially beyond the extremity of the conduit 23.

Within the axial bore 41 of the member 39 there is ciaxially situated a smaller diameter hollow pipe 52 extending almost the entire length of the bore 41 but ending short of the plugs 41a. The pipe 52 is provided with a plurality of orifices 53 projecting in the direction of the electrode bar 44 and against the upper portion of the wall defining the bore 41. Sealingly connected to pipe 52 is a depending pipe 54 projecting axially within the pipe 49. The inner pipe 54 is shown integrally connected to the inner horizontally disposed pipe 52, but for ease of fabrication it will be appreciated that this connection as at 55 may be threaded. The inner pipe 54 extends axially beyond the bottom wall 56 in the outer pipe 49 and there connects with an inlet 57 for introduction of a cooling medium, for example, water. The water can then proceed up pipe 54 into the horizontally disposed inner pipe 52, through the orifices 53 to extend proximate the electrode 44 and then return through the larger bore 41, as indicated by the arrows, to the outer pipe 49 and thence downwardly to outlet 58. The horizontally disposed inner pipe 52 is supported on inner spacer lugs 59, 59 welded thereto and to the linear member 39 within the bore 41.

A silver band 61 is applied circumferentially about the outer pipe 49 serving as an efficient connection with a source of electric current as at 62.

The cooling water outlet pipe 49 is held in concentric relationship with respect to the conduit 23 by means of an annular centering gasket 64, as shown in FIG. 1. This gasket should preferably be formed of a non-conducting relatively inert but structurally rigid material, such as Teflon. The gasket thus aids in preventing any contact of the outer conduit 23 with the water outlet pipe 49, thereby precluding the development of any grounding short circuit.

The passageway 50 defined between the outer conduit 23 and the outer water outlet pipe 49 is filled at its outer extent with a sealant material 66. This augments the partial sealant function of the centering gasket 64, thereby providing further effective assurance that atmospheric conditions, exteriorly of the furnace, which may include moisture and other oxidizing elements, do not proceed up the passageway 50 and through the refractory layers 27 and 30 into possible contact with the molybdenum electrode bar 44. Such contact would cause the appearance of the specks in the ultimately formed glass articles, as described hereinabove. A suitable sealant material has been found to be a material marketed by the Babbit Chemical Company of New Bedford, Massachusetts, under the trade name "Plas Dux." This material is a heterogeneous mixture of oils and asbestos fibers which is semi-plastic in consistency and holds its form well when introduced upwardly into the annular passageway as disclosed at 66. To prevent the possibility of this sealant material falling out by reason of gravity, a final cap 68 is positioned by hand about the terminal end of the outer conduit and extending over to the outer surface of the water outlet pipe 49. A highly suitable material for forming the cap 68 is a hand formable rubber-like material marketed by the Dow Corning Corporation of Midland, Michigan, under the trade name "Syl Trim." This material is understood to be a somewhat incompletely cured silicone rubber composition which is generally putty-like and may be hand contoured to span the distance between the walls of the outer conduit and the water outlet pipe, as illustrated.

In a preferred embodiment of the present invention provision is made for purging the upper regions 70 of the annular passageway 50. A piece of tubing 72 is projected, in close proximity to the outer conduit 23, upwardly through the cap 68 and sealing composition 66, terminating proximate to the refractory 27. A similar piece of tubing 74 diametrically disposed in conduit 63 is located to project just above the sealing composition 66. Tube 72 communicates with a closed chamber 76 containing ethylene glycol. Helium or any other inert non-oxidizing gas is then introduced through pipe 77 connecting beneath the level of the ethylene glycol in order that the rate of helium delivery may be measured. Any air or moisture purged is carried out tubing 74 where it is carried to a container 79 having a supply of ethylene glycol therein. The air and the like, which is urged or carried along with the helium, is introduced into the container 79 below the level of the ethylene glycol whereby any moisture carried along will be absorbed by the ethylene glycol, thereby giving a visible indication of the amount of moisture removed from the critical part of the electrode assembly. The tubing 77 used in introducing the helium to the chamber 76 measured 3/16" diameter and a helium gas rate of from around 10 to 110 bubbles per minute therethrough proved eminently satisfactory for maintaining the electrode assembly 11 absolutely devoid of air or moisture during its operation.

The electrode sub-assembly 37 is desirably positioned in the casing member 15 in the following fashion. First the layer 27 of Crystallite refractory as a preformed rectangular section is located in the casing flush with bottom wall 21. Then the second layer, designated by the reference numeral 30, is laid down as a trowelable composition prepared by mixing a powdered refractory, preferably Zircon, with an appropriate amount of water which is not particularly critical. Suffice it to say, that only enough water is used to form an easily formable consistency. The electrode sub-assembly 37 is then horizontally disposed on top of this formable layer 30 which will permit some adjustment of the lateral disposition whereby a completely level positioning of the horizontal electrode holder 37 and axial registry of pipe 49 in conduit 23 is assured. Thereafter, the lengths 32a through 32d of Zircon refractory are inserted down between the linear member 39 and the side and end walls of the casing. As indicated, this last section of Zircon can be precut or preformed as a single annular piece, thereby defining a central cavity for receiving the electrode holder 37.

Installation of electrode assemblies, as herein described, in commercial furnaces have been found to provide essentially trouble-free operation and glass articles formed from the glass and melted in such furnaces have been found to be completely devoid of any of the "white smear" or "black molybdic oxide" phenomena usually evidenced by small metallic oxide particles of the molybdenum as referred to hereinabove.

It will be appreciated that other refractory materials may be employed as encasing materials for the electrode as described herein. Generally, these refractories are readily available on the market from various manufacturers. I have found it eminently desirable that the uppermost layer of refractory surrounding the horizontal electrode holder to be formed of Zircon (having the formula $Zr \cdot SiO_4$ or $Zr_2 \cdot SiO_2$), since it is eminently resistant to the corrosive and erosive effects within the glass melting furnace in addition to its electrical insulating properties.

The present invention is particularly applicable to melting a negative temperature coefficient electrolyte such as glass in an improved manner without introducing contaminants thereto. It is equally applicable to the direct or supplemental heating of other materials. The electrode assembly is especially useful for booster heating of high-quality glass for electronic or optical uses.

Modifications may be resorted to within the spirit and scope of the present invention.

I claim:
1. An electrode assembly for introducing an electrode through the wall of a furnace, comprising an outer shell defining a cavity and being adapted for mounting in a furnace wall with the cavity facing inwardly, a hollow conduit member communicating with said cavity and extending oppositely from said cavity to project through the wall of said furnace and beyond, a mass of insulation positioned in said cavity defining a second inwardly facing cavity, an electrode recessed within said second cavity whereby a limited surface area of said electrode is exposed within said furnace, said electrode including a connected leg extending rearwardly through said insulation and said conduit for connection to a source of current, said leg extending in axial, spaced relationship within said conduit defining therebetween an annular passageway extending interiorly to said insulation, and sealant means for said annular passageway thereby excluding air, moisture and the like from the passageway.

2. The electrode assembly as claimed in claim 1, which includes means for introducing a gaseous substance to said passageway proximate said refractory and for withdrawing same, said substance being relatively inert and non-oxidizing and being capable of purging said passageway of air, moisture and the like.

3. An electrode assembly for sealingly introducing an electrode through the wall of a glass melting furnace, comprising an outer shell defining a cavity and being adapted for mounting in a furnace wall with the cavity facing inwardly, a hollow conduit member communicating with said cavity and extending oppositely from said cavity to project through the wall of said furnace and beyond, a layer of refractory positioned in said cavity constructed and arranged to define a second, inwardly-facing, elongated cavity, a T-shaped electrode including an elongated cross-member and a normally extending leg, the cross-member being recessed within said second cavity in such fashion that essentially only one elongated face of said cross-member is exposed within said furnace, said leg extending rearwardly through said refractory and said conduit for connection to a source of current, said leg extending in axial spaced relationship within said conduit defining therebetween an annular passageway extending interiorly to said refractory, and sealant means located in the outer extent of said annular passageway thereby excluding air from the inner extent of said passageway proximate said refractory.

4. An electrode assembly comprising a housing having a bottom wall and upstanding connected side walls defining an elongated cavity, a hollow conduit member communicating centrally therewith and extending oppositely from said cavity, said conduit being adapted for projection through the wall of a glass furnace and beyond and said side walls being adapted for recessed location with respect to the interior surface of said glass furnace wall, a mass of refractory in said cavity defining a second cavity, an elongated electrode recessed within said second refractory cavity whereby essentially only one face of said electrode is exposed within said furnace, said electrode including a centrally located connected leg extending axially rearwardly through said refractory and said conduit for connection to a source of current, means for holding said member in axial, spaced relationship with said conduit defining therebetween an annular passageway extending interiorly to said refractory, sealant means for the outermost extent of said annular passageway to exclude air therefrom, and a pair of tubes extending through said material into said annular passageway for introducing and withdrawing an inert gaseous substance capable of absorbing moisture.

5. An electrode assembly as claimed in claim 3, wherein (1) said cross-member and leg are hollow to permit circulation of a cooling medium to said cross-member, and (2) said cross-member holds flushly a linear molybdenum bar.

6. An electrode assembly as claimed in claim 5, which includes an inert gas delivering means communicating with said passageway.

7. The method of mounting an electrode in a furnace wall comprising forming a recess in the interior wall surface of said furnace, locating a rigid casing snugly within said recess, filling said casing with refractory material, contouring a cavity in said refractory material, positioning a linear electrode member in recessed relation in said cavity so that one elongated face is exposed within said furnace, forming an opening in said furnace wall to connect with said casing and centrally thereof, positioning a conduit within said opening to connect sealingly with said casing, introducing an electrically conducting member through said conduit in axial, spaced relationship therewith leaving an annular passageway, connecting said member with said electrode and positioning a generally air impervious sealant in the outer extent of said passageway.

8. The method as claimed in claim 7, which includes the step of introducing and removing an inert, non-oxidizing substance to said annular passageway to thereby purge air, moisture and the like therefrom.

9. The method as claimed in claim 8, wherein the substance is helium.

10. The method as claimed in claim 9, wherein the helium is introduced at the rate of from about 10 to about 110 bubbles a minute as determined by a delivery tube measuring $3/16$ inches in diameter.

References Cited in the file of this patent

UNITED STATES PATENTS

| | | |
|---|---|---|
| 1,542,716 | Payne | June 16, 1925 |
| 2,594,973 | Muehlenkamp | Apr. 29, 1952 |
| 2,693,498 | Penberthy | Nov. 2, 1954 |
| 2,908,738 | Rough | Oct. 13, 1959 |